US012240142B2

(12) United States Patent
Fechner et al.

(10) Patent No.: US 12,240,142 B2
(45) Date of Patent: Mar. 4, 2025

(54) METHOD OF GLUE-COATING PLANT PARTICLES

(71) Applicants: Hans W. Fechner, Duesseldorf (DE); Michael Schoeler, Rheurdt (DE); Jochem Berns, Grefath (DE); Rolf Trummel, Duesseldorf (DE)

(72) Inventors: Hans W. Fechner, Duesseldorf (DE); Michael Schoeler, Rheurdt (DE); Jochem Berns, Grefath (DE); Rolf Trummel, Duesseldorf (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 36 days.

(21) Appl. No.: 17/949,718

(22) Filed: Sep. 21, 2022

(65) Prior Publication Data

US 2023/0019663 A1 Jan. 19, 2023

Related U.S. Application Data

(62) Division of application No. 16/630,214, filed on Jan. 23, 2020, now abandoned.

(51) Int. Cl.

| | |
|---|---|
| ***B27N 3/18*** | (2006.01) |
| ***B02C 9/02*** | (2006.01) |
| ***B02C 9/04*** | (2006.01) |
| ***B02C 21/00*** | (2006.01) |
| ***B02C 23/20*** | (2006.01) |
| ***B02C 23/38*** | (2006.01) |
| ***B27K 9/00*** | (2006.01) |

(Continued)

(52) U.S. Cl.
CPC .................. *B27N 3/18* (2013.01); *B02C 9/02* (2013.01); *B02C 9/04* (2013.01); *B02C 21/00* (2013.01); *B02C 23/20* (2013.01); *B02C 23/38* (2013.01); *B27K 9/00* (2013.01); *B27N 1/0218* (2013.01); *B27N 3/02* (2013.01); *B27N 3/04* (2013.01); *B07B 4/02* (2013.01); *B07B 4/06* (2013.01); *B07B 11/02* (2013.01); *B07B 11/06* (2013.01)

(58) Field of Classification Search
CPC .......... B27N 1/0218; B27N 3/18; B07B 4/02; B27K 9/00
See application file for complete search history.

(56) References Cited

U.S. PATENT DOCUMENTS

| | | | | |
|---|---|---|---|---|
| 247,694 A * | 9/1881 | Schultz | B07B 4/02 | 209/139.1 |
| 3,775,145 A * | 11/1973 | Ware | C09J 103/00 | 106/128.1 |

(Continued)

FOREIGN PATENT DOCUMENTS

| | | |
|---|---|---|
| DE | 3021455 A1 | 12/1981 |
| DE | 19807622 C1 | 8/1999 |

(Continued)

*Primary Examiner* — Andrew D Graham
(74) *Attorney, Agent, or Firm* — Andrew Wilford

(57) ABSTRACT

Fiberboard or chipboard is made by first comminuting vegetable starting material in a first comminutor into a stream of loose plant particles with silicate particles. Then, in a first classifier silicate particles of a diameter of less than 50 μm are separated from the plant particles of the stream. The plant particles remaining in the stream are then glue-coated, and the stream is pressed into fiberboard or chipboard.

10 Claims, 4 Drawing Sheets

(51) Int. Cl.

| | |
|---|---|
| ***B27N 1/02*** | (2006.01) |
| ***B27N 3/02*** | (2006.01) |
| ***B27N 3/04*** | (2006.01) |
| *B07B 4/02* | (2006.01) |
| *B07B 4/06* | (2006.01) |
| *B07B 11/02* | (2006.01) |
| *B07B 11/06* | (2006.01) |

(56) References Cited

U.S. PATENT DOCUMENTS

| | | | | |
|---|---|---|---|---|
| 3,892,706 | A * | 7/1975 | Jetzer | B03B 9/06<br>241/DIG. 38 |
| 4,188,130 | A * | 2/1980 | Engels | B27N 1/0218<br>366/228 |
| 4,344,859 | A * | 8/1982 | Burke, Jr. | B01F 23/59<br>366/159.1 |
| 4,572,845 | A * | 2/1986 | Christen | B27N 1/0218<br>427/242 |
| 5,032,256 | A * | 7/1991 | Vickery | B07B 4/02<br>209/32 |
| 5,207,830 | A * | 5/1993 | Cowan | B01J 20/28016<br>428/404 |
| 5,281,278 | A * | 1/1994 | Stein | B07B 4/00<br>134/25.1 |
| 5,294,002 | A * | 3/1994 | Moses | B07B 4/02<br>209/150 |
| 5,318,227 | A * | 6/1994 | Rogers | C01F 11/464<br>241/19 |
| 5,331,978 | A * | 7/1994 | Parker | B07B 4/08<br>131/109.2 |
| 5,554,330 | A * | 9/1996 | Flannery | B27N 1/00<br>264/122 |
| 5,607,061 | A * | 3/1997 | Felden | B07B 11/04<br>209/139.1 |
| 5,727,690 | A * | 3/1998 | Hofmeister | A23N 12/06<br>209/147 |
| 5,871,103 | A * | 2/1999 | Durst | B07B 4/02<br>209/208 |
| 5,912,038 | A * | 6/1999 | Gruenwald | A23L 19/03<br>209/133 |
| 6,406,729 | B1 * | 6/2002 | Miller | A23C 11/045<br>426/453 |
| 6,451,115 | B1 * | 9/2002 | Wilson | B01J 2/006<br>118/19 |
| 6,568,932 | B1 * | 5/2003 | Murai | B27N 5/00<br>264/297.6 |
| 6,652,695 | B1 | 11/2003 | Von Der Heide et al. | |
| 6,780,002 | B2 * | 8/2004 | Aengenvoort | B27N 3/14<br>209/673 |
| 6,883,667 | B1 * | 4/2005 | Lindsey | B07B 11/04<br>209/132 |
| 6,883,668 | B1 * | 4/2005 | Lindsey | B07B 11/04<br>209/132 |
| 7,055,562 | B2 * | 6/2006 | Scholer | B27L 11/002<br>144/242.1 |
| 8,944,672 | B2 * | 2/2015 | Wenger | B01F 27/071<br>366/290 |
| 9,254,581 | B2 * | 2/2016 | Ohlendorf | B27N 1/0254 |
| 9,932,457 | B2 * | 4/2018 | Hill | C08G 18/5021 |
| 10,843,418 | B2 * | 11/2020 | Drees | B30B 15/047 |
| 2003/0066168 | A1 * | 4/2003 | Schneider | B27N 1/0272<br>19/1 |
| 2003/0150522 | A1 * | 8/2003 | Suzuki | B27N 3/143<br>144/380 |
| 2004/0159587 | A1 * | 8/2004 | Couture | B07B 4/02<br>209/132 |
| 2004/0234692 | A1 * | 11/2004 | Nopper | B27N 1/029<br>427/294 |
| 2005/0080166 | A1 * | 4/2005 | Keller | C09D 5/033<br>502/402 |
| 2005/0258561 | A1 | 11/2005 | Churchill et al. | |
| 2006/0280907 | A1 * | 12/2006 | Whitaker | C04B 18/067<br>428/143 |
| 2007/0095728 | A1 * | 5/2007 | Ottow | B07B 4/02<br>209/714 |
| 2008/0169226 | A1 | 7/2008 | Dal Ben | |
| 2009/0188843 | A1 * | 7/2009 | Yasuda | B29B 17/02<br>209/646 |
| 2010/0163463 | A1 * | 7/2010 | Dal Ben | B07B 4/02<br>209/133 |
| 2011/0287260 | A1 * | 11/2011 | Sandler | B32B 5/18<br>521/97 |
| 2012/0123022 | A1 * | 5/2012 | Berns | B29B 7/92<br>523/322 |
| 2013/0052393 | A1 * | 2/2013 | Hahn | E04B 1/803<br>427/350 |
| 2013/0125799 | A1 * | 5/2013 | Fried | F23G 5/08<br>241/24.31 |
| 2013/0134073 | A1 * | 5/2013 | Borota | B07B 4/02<br>209/34 |
| 2013/0276951 | A1 * | 10/2013 | Speidel | B27N 3/14<br>156/62.2 |
| 2014/0106069 | A1 * | 4/2014 | Ohlendorf | B27N 1/0254<br>427/213 |
| 2014/0175196 | A1 * | 6/2014 | Zhang | B09B 3/45<br>241/60 |
| 2014/0306045 | A1 * | 10/2014 | Seppi | B02C 23/20<br>241/60 |
| 2015/0041573 | A1 * | 2/2015 | Wissing | B29B 17/0026<br>241/3 |
| 2015/0197434 | A1 * | 7/2015 | Zou | B01J 20/28007<br>210/730 |
| 2015/0314486 | A1 * | 11/2015 | Hayashi | B07B 9/00<br>241/49 |
| 2020/0368782 | A1 * | 11/2020 | Fechner | B07B 11/02 |

FOREIGN PATENT DOCUMENTS

| | | | |
|---|---|---|---|
| DE | 10116686 | A1 | 10/2002 |
| DE | 102010053467 | A1 | 6/2012 |
| DE | 10 2015 120 653 | A1 | 6/2017 |

* cited by examiner

METHOD OF GLUE-COATING PLANT PARTICLES

CROSS REFERENCE TO RELATED APPLICATIONS

This application is a division of U.S. patent application Ser. No. 16/630,214 filed 10 Jan. 2020 as the US-national stage of PCT application PCT/EP2018/070600 filed 30 Jul. 2018 and claiming the priority of German patent application 102017120043.6 itself filed 31 Aug. 2017.

FIELD OF THE INVENTION

The invention relates to a method of glue-coating plant particles, in particular from annual plants (for example straw), in order to produce boards, for example fiberboard or chipboard, having at least one device for comminuting plant-based starting material to form loose plant particles, and having a device for glue-coating the plant particles.

BACKGROUND OF THE INVENTION

The vegetable starting material is a lignocellulosic substance such for example as wood. However, it is especially preferably lignocellulosic feedstock from so-called annual plants, i.e. plants that require only one growing season from germination of the seed to the development of the entire plant, flowering, fertilization, and maturation of the new seed. Examples of such fast-growing plants are cereals (or the straw produced by them), such as rice or rice straw, but also bamboo, as well as bagasse, reed, or giant reed. Bulk particles from such plants or vegetable starting material are used in practice for making boards, for example chipboard or fiberboard, by glue-coating the plant particles with a binder or glue and then pressing them into boards in a press. Annual plants (particularly straw made from them) are used as an advantageous alternative to conventional wood. In conventional agriculture, such as rice cultivation, a need therefore exists to utilize the remaining straw after harvesting and not, as has been common practice to date, leave or burn it in the fields, using it instead for making fiberboard or chipboard. The possibility of material boards based on straw, such as rice straw, for example, is described inter alia in DE 10 2009 057 916 and DE 10 2015 120 653.

To make boards from vegetable starting material (wood or annual plants), suitable loose particles (chips or fibers) are first appropriately produced by suitable comminuters and glue-coated. Subsequently, both particles from wood and particles from annual plants (for example straw) can be processed identically or in a very similar manner by scattering the (glue-coated) particles onto a conveyor belt, for example, using one or more spreaders to form a material mat and feeding them to a press, the loose-particle mat being pressed into a board in the press by application of pressure and heat. The press can be a cycle press (for example a single- or multiple-platen press) or a continuously operating press.

Overall, the use of annual plants, for example leftover straw therefrom, represents a promising alternative to the use of wood for making fiberboard or chipboard. One problem in connection with the processing of particles from annual plants, for example rice straw, is the fact that annual plants store high amounts of silicate during their growth that is introduced into the production process and can be disruptive, since such mineral silicates can result in high wear in a variety of system parts due to their properties. For this reason, it has already been proposed, in DE 10 2009 057 916, for example, that the parts of a mixer for the glue-coating of fibers have a wear-resistant design, since the silicates abrade the surfaces of the parts intensively. This is where the invention comes in.

In addition, the above-described spreaders are known from the prior art with which a loose-particle mat is formed on a conveyor belt, then fed to a press in which the loose-particle mat is pressed into a board by application of pressure and heat. A spreader for making such a mat of glue particles is for example known from US 2003/0066168 [U.S. Pat. No. 6,902,125]. An air classifier can be integrated into this spreader or opening device.

A device for air classification of chips or fibers mixed with binder is known, for example, from DE 198 35 419.

OBJECT OF THE INVENTION

It is the object of the invention to provide an apparatus and a method with which glue-coated plant particles, particularly from annual plants, for making boards (for example fiberboard or chipboard) can be produced in an economical manner. In particular, the problems arising from silicates are to be reduced or minimized.

SUMMARY OF THE INVENTION

To achieve this object, in an apparatus of this generic type for glue-coating plant particles for making boards, the invention teaches the step of providing at least a first separating device, in particular a classifier for separating (or precipitating) silicate particles from the plant particles or stream of plant particles, between the comminuter and the glue coater.

The invention proceeds in this regard from the discovery that boards, for example fiberboard or chipboard, can be manufactured economically in high quality not only from wood, but also particularly from annual plants that store or absorb a high proportion of mineral silicates during growth. It was recognized in the context of the invention that these silicates that are embedded during growth can be separated or precipitated from the plant particles during the production of the glue-coated plant particles that form the basic material for making the boards, meaning in particular that problems with wear in the parts of the apparatus during making boards can be avoided and elaborate measures for improving the wear protection in the apparatus dispensed with. In addition, the quality of the board is substantially improved by reducing the amount of silicate. In the context of the invention, "silicates" or "silicate particles" thus refer particularly to the silicates/silicate particles that are embedded in the plants or fibers or cells thereof during growth and released as a result of the comminution of the plants and/or the opening of the fibers. Silicate particles preferably refer to those with a diameter of less than 50 μm, preferably up to 20 μm.

In a preferred embodiment, the classifier for separating the silicate particles from the plant particle stream is an air classifier. In this air classifier, an air stream (for example in the form of a cross-flow) is applied to the supplied plant particles, with silicate particles being discharged with the air stream via an air outlet, and with the plant particles (and any foreign bodies) being captured by gravity with a particle trap underneath the air outlet and discharged as a product for further processing. The invention proceeds in this regard from the surprising insight that silicates embedded in plant material, for example straw or the like, can be effectively separated from the plant particles intended for further processing with the aid of an air classifier. This is due, among other things, to the fact that the silicates are present in the plant material, for example in straw particles or the like, in a relatively uniform size and shape, particularly in a sphere-like shape inside the plant cells with a small diameter of generally less than 50 μm, for example about 5 μm to 20 μm, whereas the plant fiber particles intended for board production are substantially larger. By virtue of their small and substantially uniform size, the silicate particles are reliably entrained in the air classifier by the air stream that is introduced into the classifier, so that they can be removed with the air stream via an air outlet, while the other particles, that is, particularly the plant particles that are to be further processed, fall down and are captured in a suitable particle trap or discharged. This separation is surprisingly efficient. This is also due to the fact that the silicate particles, because of their very small (and uniform) dimensions, form an aerosol together with the air stream, so that the silicate particles are reliably transported as solid particles suspended in the air stream (or another gas stream). The air (or another gas) thus constitutes a carrier for the silicate particles.

The classifier, which is an air classifier, can preferably have an (upper) material inlet for supplying the plant particles and an air inlet beneath the material inlet. In addition, an air outlet is provided through which the supplied air (or other gas) with the silicate particles is discharged. The particle trap is provided beneath the air outlet for the plant particles that are to be further processed. The plant particles that are introduced into a classifier housing from above via a material inlet are thus preferably subjected to the air stream in the form of a cross-flow. In principle, however, it is also possible for the classifying air to be provided from below in the form of an upwardly flowing stream, for example.

It is possible for the supply air to be drawn into the classifier housing using the supply-air fan. In a preferred embodiment, however, air is supplied passively by connecting an exhaust fan to the air outlet. It is easily possible for air, for example ambient air, to be sucked into the classifier housing via the air inlet, in which case the air inlet can preferably be provided in a suitable manner with protective measures such as a protective screen and/or a rain cover. Alternatively, there is also the possibility of circulating the air and thus returning the extracted air (after appropriate separation of the silicates from the air/silicate mixture) into the vicinity of the air inlet.

In a preferred development, in addition to the particle trap for the plant particles, the air classifier also has a coarse-material trap that is also below the air outlet and upstream from the particle trap in the direction of flow. Large and heavy foreign bodies such as stones that get into the classifier with the plant particles can be separated in this way and removed via the coarse-material trap, so that a separation into three fractions is performed in this embodiment (coarse material/stones, plant particles, silicate particles).

It is of particular importance in the context of the invention that, when the vegetable starting material (for example straw) is processed, it is comminuted so that the cells within the vegetable material in which the silicate particles are embedded are broken up and release the silicate so that it can be separated in the manner described. In an especially preferred development, the silicate is separated in two stages. This means that a second comminuter in which the plant particles are further reduced in size is between the first classifier (for initial silicate separation) and the glue coater, and that a second classifier (for a second silicate separation) is between this second comminuter and the glue coater.

It is generally expedient to first process the starting material, straw, for example, in a coarse comminuter, for example in a straw chopper. This is then followed by the previously described first comminuter, which can be a mill, preferably as a hammer mill or the like. A multitude of cells in which silicates are contained are already broken up in this initial comminution process or in these comminution processes, so that, after this initial comminution, which can be carried out with multiple different comminuters, an initial silicate separation in the manner described is already advantageous. In a preferred development, it is then especially expedient to further comminute the plant particles, which are already roughly separated from silicate particles, in a second comminution process. This is advantageous particularly when plant fibers for fiberboard, such as MDF boards, for example, are to be produced. In this case, the second comminuter can be a fiberizing device or system for making plant particles in the form of fibers. In particular, such a fiberizing system has a refiner in which the chip-like particles are broken down into fibers in an inherently known manner. In the course of this fiberization, the wood cells or plant cells in which the silicate particles are embedded are further or completely broken open, so that silicates are released in this second stage (which are then separated in the second classifier). It is interesting to note that the first classifier and the second classifier can be adapted to circumstances in terms of dimensioning and flow characteristics and, in particular, particle characteristics, thus making particularly efficient silicate separation possible in two stages. This two-stage procedure is especially advantageous in the production of vegetable fibers for making fiberboard, for example MDF boards. However, the two-stage separation of silicate particles can also be useful in the production of straw chips or the like for making chipboard if no fiberization is performed in a refiner or the like. Multistage comminution is also expedient in the production of chips, so that the second comminuter can then be a suitable mill and this second comminution can be carried out in a milling process.

It is also possible for the second comminuter to not be a refiner when making fibers, but rather alternatively serve as a mechanical device such for example as a mill.

In principle, the second classifier that is preferably provided can have the same design as the described first classifier. Optionally, it may be expedient to provide separation into three fractions (including the removal of foreign bodies) in the first classifier and for a separation into only two fractions to be performed in the second classifier, so that an additional coarse-material trap in the form of a "stone trap," for example, can be dispensed with there.

As described, the first and/or second classifier is preferably provided with a particle trap, for example for plant particles. Optionally, a plurality of particle traps that are in a row (in the direction of flow) or a particle trap with a plurality of zones that are in a row can also be provided. This configuration has the advantage that it is optionally possible to perform splitting (of the plant particles) into multiple (useful) fractions. In an advantageous development, the location and/or length (along the direction of flow) of one or more particle traps or catchment zones can be or are (variably) set, specifically during assembly and/or during placement into operation and/or during operation. This can be achieved by adjustable baffle plates in the vicinity of particle traps.

The classifier, which preferably operates in the manner described as an air classifier, has a housing that, in one very simple embodiment, can for example be a box. Such a box-shaped housing can be a cube or the like, in which case at least the material inlet and the air inlet preferably extend over (substantially) the entire width of the housing. The material inlet can, for example, be integrated into the (upper wall) ceiling of the box-shaped housing, particularly relative to the direction of flow in the front region of the ceiling, so that the material falls from above into the box-shaped housing. In one very simple embodiment, the air inlet can be integrated into a front wall of the housing, for example into the upper region of the front wall. The air outlet can, for example, be integrated into a rear wall opposite the front wall or be arranged in the vicinity of the rear wall, particularly also in the upper region of this rear wall, for example. This means that the air stream with the silicate particles essentially flows through the housing in the upper region, while the plant particles and any stones or similar coarse materials fall out of the air stream. The particle trap and/or the coarse-material trap is consequently in the vicinity of the bottom of the box-shaped housing, so that the plant particles and/or the coarse materials are received in the lower region of the box-shaped housing. From there, they can be discharged downward or laterally out of the housing. To break up the material to be introduced, rollers, such as crushing rollers, for example, can also be integrated into the material inlet, which can be formed as a chute, for example, or connected to a chute, In addition, the division of the material can take place at the inlet, so that a plurality of "curtains" of particles are created. It is also possible to provide feeders such as feed screws in the vicinity of the material inlet. A discharge device can be integrated into the particle trap in for example the lower region of the housing, or a discharge device can be connected to this particle trap and have for example one or more output augers. Alternatively, other discharge devices such as conveyor belts or the like can also be considered, but output augers have the advantage that they are substantially (gas-)tight, so that additional cell-wheel feeders or the like can be dispensed with. A cell-wheel feeder can also be provided in order to render the chamber floor of the classifier gas-tight.

A classifier whose (box-shaped) housing is composed of one or more ISO freight containers is characterized by an especially simple construction and particularly economical transport. For instance, the housing can be composed of multiple, for example two or three superposed standard containers, these being preferably 40-foot standard containers that can also for example be high-cube containers. In this case, the width and length of the classifier housing are defined by the width and length of the standard containers. The invention proceeds in this regard from the surprising insight that, in spite of such a simple construction, silicate particles can be separated economically from the particle stream with a high level of efficiency. In the form of freight containers, the housing can be transported modularly to the deployment site and modified for use there. The housing or the containers can then be (subsequently) equipped with conventional maintenance platforms or the like that are set up on and/or attached for example to the outside of the containers.

The plant particles freed of silicate particles in the manner described are provided with a binder for further processing in the glue coater and thus glue-coated. Such a glue coater can have an inherently known design. Preferably, a glue coater is used that is a drum mixer such as that described in DE 10 2009 057 916. It is a continuously operating mixer having a mixing chamber and one or more mixing tools that are attached to a rotating shaft, the mixing tools mixing the particles, for example fibers, with the binder and conveying them in a direction of conveyance through the mixing chamber. Such a mixer can be preferably operated with a particularly high centrifugal acceleration. This means that the speed of the mixer shaft and the diameter of the mixing chamber are coordinated with one another with the understanding that the (nominal) centrifugal acceleration of the fibers in the vicinity of the mixing chamber jacket is from 10,000 to 30,000 $m/s^2$. With regard to the specifics of the design and method of operation, reference is made to DE 10 2009 057 916.

The apparatus described relates to the production of the glue-coated plant particles, for example glue-coated fibers or chips, that are specifically intended for making fiberboard or chipboard. The production of the glue-coated plant particles is thus protected in isolation (without the subsequent pressing process). However, the invention also relates to an apparatus for making boards, for example chipboard or fiberboard, from such glue-coated plant particles. Such an apparatus for making boards thus comprises, on the one hand, the apparatus for making the glue-coated plant particles already described and, in addition, at least one spreader located downstream from the glue coater for making a loose-particle mat from the glue-coated plant particles and a press located downstream from the spreader in which the loose-particle mat is pressed into a board under application of pressure and/or heat. According to the invention, not only the apparatus making the glue-coated plant particles is protected, but also the entire apparatus for making the boards, which also comprises in particular one or more strewers and at least one press. The press can be a cycle press, for example a single- or multiple-platen press. The press is preferably a continuously operating press that for example can be a dual-belt press having an upper pressing plate and a lower pressing plate as well as continuously circulating upper and lower pressing belts in the upper part of the press and in the lower part of the press, for example steel belts that are supported on the pressing plates with interposition of rolling element assemblies, for example roller bars, and with the upper pressing plate and/or the lower pressing plate being acted upon with pressing cylinders.

The invention relates not only to the apparatus described, but also to a method of making boards from plant particles, for example from plant fibers or plant shavings, using an apparatus of the type described, where plant particles are produced from vegetable starting material, in particular from annual plants (for example straw) through comminution, and subsequently glue-coated, and where a loose-particle mat is manufactured from the glue-coated plant particles and pressed in a press to form a board. This method is characterized in that, after the starting material has been comminuted, silicate particles are separated from the plant particles or the particle stream before the glue-coating. The method especially preferably comprises two stages, so that silicate particles are separated from the particle stream both after a first comminution and after a second comminution, for example fiberization.

The apparatus described and the method described can in principle be used for processing plant particles from wood and hence for the processing of wood fibers or wood chips. Especially preferably, plant particles from annual plants are processed, for example from straw or the like, that remain after a plant has undergone threshing, for example in the form of rice straw. According to the invention, this straw can be used with particular effectiveness in making fiberboard or chipboard, specifically because of the described precipitation of the silicate components and the avoidance of the problems previously observed during the processing of such materials.

BRIEF DESCRIPTION OF THE DRAWING

The invention will be explained in greater detail in the following with reference to the drawing, which merely illustrates embodiments. In the drawing.

SPECIFIC DESCRIPTION OF THE INVENTION

Figure 1:
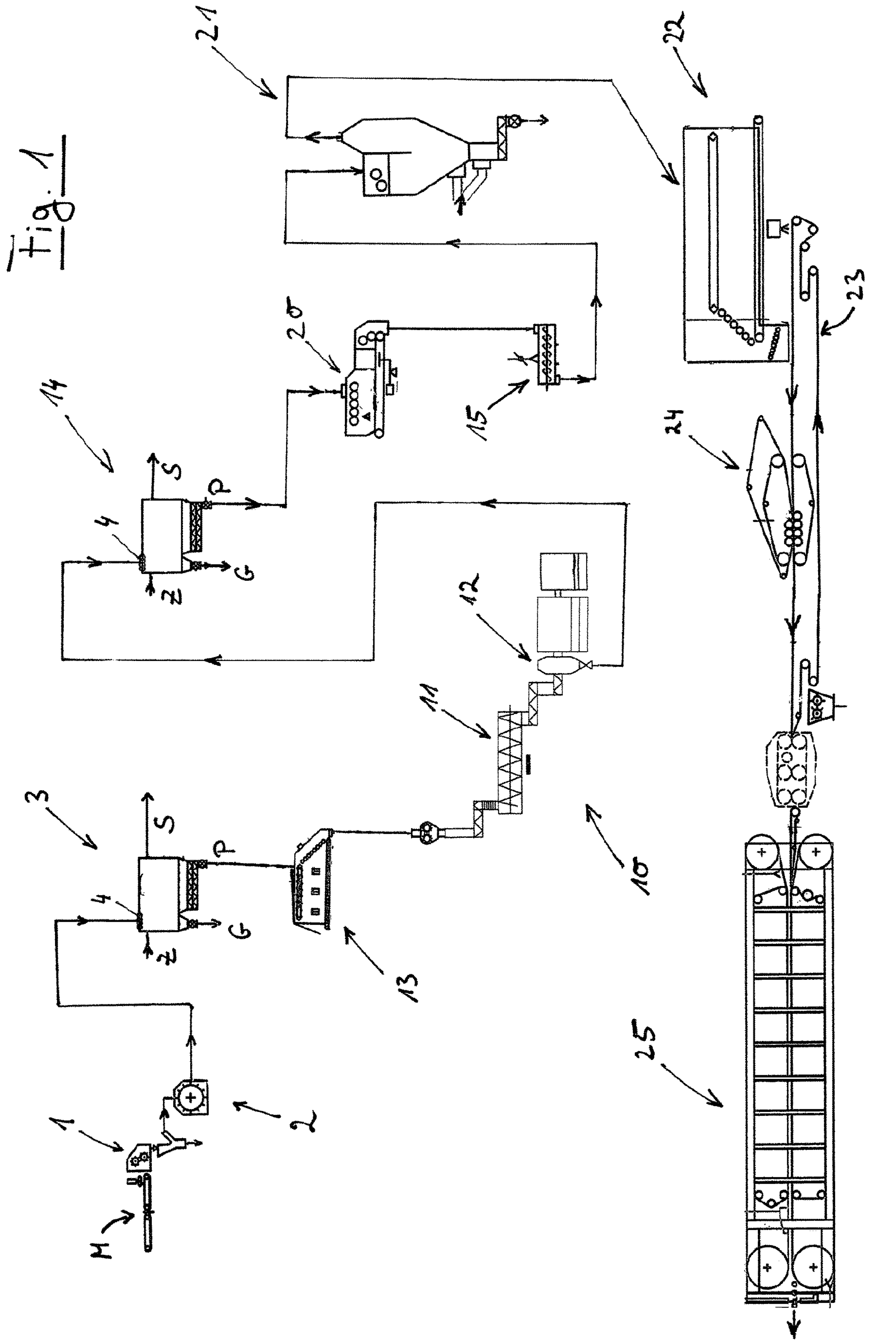
FIG. 1 is a highly simplified schematic view of an apparatus (and a method) for making boards from glue-coated plant particles.

In FIG. 1 a system is shown with the glue-coated plant particles, for example glue-coated fibers from annual plants, for example made of straw and particularly preferably rice straw and pressed into boards.

After for example precomminution in a straw chopper 1, straw that is provided as a starting material M is comminuted in a first comminuter 2, a hammer mill 2 in this embodiment. The material produced in this first comminuter 2 is fed to a first classifier 3 forming a first classifying stage for separating silicate particles from the straw particles. This first classifier 3, which will be discussed in greater detail below, is shown in an enlarged view in FIGS. 2 to 5.

In such a classifier 3, which is an air classifier, the straw particles are introduced into the classifier housing 5 via an upper material inlet 4 and an air stream (supply air Z) is injected into the classifier housing. For this purpose, the classifier 3 has a front, upper air inlet 6 and a rear, upper air outlet 7. A particle trap 8 is provided for the straw particles P that are freed of silicate S is provided beneath the air outlet 7. A coarse-material trap 9 for receiving foreign bodies, for example stones or similar coarse material G, is upstream from the particle trap 8 in the direction of flow. In this classifier, the silicate particles S are entrained by the air stream due to their very small and uniform size and discharged via the air outlet 7, while the plant particles that are intended for further processing, for example straw particles P, drop into the particle trap 8 and are discharged thence. In principle, it is possible to feed the straw particles that are freed of silicate to a glue coater and then to press the glue-coated particles into a board after forming a loose-particle mat in a press. In this embodiment shown, however, the straw particles that are freed of silicate in the first classifying stage are optionally fed to a second comminuter 10 in an additional step after being temporarily stored in a bunker 13. In this embodiment, this second comminuter is a fiberizing device in which straw fibers are produced from the straw particles for making fiberboard. This fiberizing device 10 can, in an inherently known manner, have a digester 11 (merely suggested) in which the particles are softened for example with high-pressure steam. This is followed in an inherently known manner by a refiner 12, in which the softened particles are ground into fibers. In the embodiment shown, the fibers ground in this manner do not, after appropriate drying, travel directly into a glue coater via a blow line, for example (not shown); instead, further separation of silicate particles from the straw particles or the straw fibers now produced is performed before glue-coating.

It is always possible to divide the particle stream into multiple parallel substreams and thus to work with multiple parallel classifiers. In the figures, only one classifier is shown as an example. The second classifier 14, which is merely suggested in FIG. 1, is again an air classifier. It is basically constructed in the same manner and functions in the same manner as the first classifier 3 that was already described, it being optionally possible to dispense with the coarse-material trap or stone trap in the vicinity of the second classifier. In any case, silicate particles S are again discharged and disposed of via an air outlet 7 in this second classifying stage or used for other processes. The straw fibers P that are freed of silicate S are in turn discharged via the particle trap 8 and, optionally after temporary storage in a bunker 20, fed to a glue coater 15. Even though only one glue coater 15 is shown as an example in the drawing, multiple glue coaters can be provided for parallel operation here as well. In this embodiment, this glue coater 15 is a mixer that, in terms of its construction and functionality, corresponds to the mixer described in DE 10 2009 057 916. In this glue mixer, the straw fibers are glue-coated with an isocyanate or other glue.

The glue-coated straw fibers produced in this manner and freed of silicate are now usable for making fiberboard. For that purpose, they are fed to a spreader 22 via a fiber classifier 21, for example, in which lumps of glue or the like are separated. Using this spreader 22, the glue-coated straw fibers are strewed on a conveyor belt, for example, to form a loose-particle mat and, from there, optionally after another pretreatment in a prepress, for example, the mat travels to a hot press 25 where the loose-particle mat of glue-coated straw fibers is pressed into a fiberboard. The press 25 can be a continuously operating press 25, here a dual-belt press.

Figure 5:
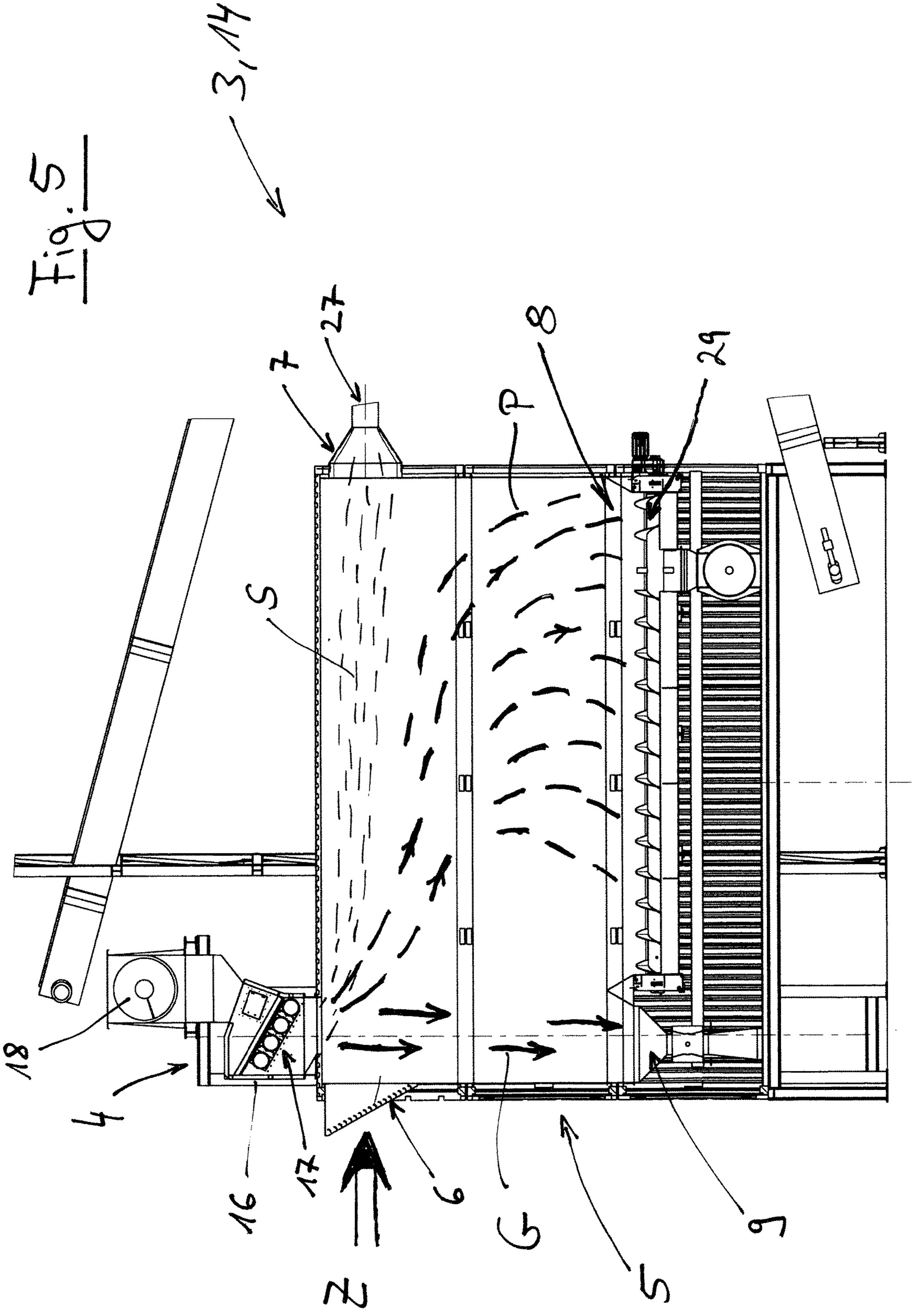
FIG. 5 is a section taken at A in FIG. 3 showing flow conditions.

According to the invention, the classifier 3 or 14 is of particular importance for the separation of silicate particles from the particle stream of the straw particles or straw fibers. The classifier is shown in FIGS. 2 and 5.

The classifier 3 or 14 is an air classifier. In this embodiment, it has a box-shaped housing 5 with the material inlet 4, the air inlet 6, the air outlet 7, as well as the particle trap 8 and the coarse-material trap 9. An upper chute 16 holding crushing rollers 17 is connected to the material inlet 4. Moreover, feed screws 18 are shown that feed the material to the material inlet 4. The material inlet 4 extends substantially over the entire width of the classifier housing 5 and is integrated into the upper wall or ceiling of the classifier housing in this embodiment shown, so that the material falls into the classifier housing from above. The air inlet 6 is integrated into the upper region of the front wall of the classifier housing. This air inlet 6 can also extend over the entire width of the classifier housing 5. The air outlet 7, which also extends over the entire width of the classifier housing, is on the rear wall of the classifier housing and then merges into at least one outlet line 27 with a reduced diameter, the stripped-out silicate particles S being discharged with the air stream via this line or lines 27. In this embodiment, output augers 29 are provided in the lower particle trap 8 with which the straw particles P that are freed of silicate are discharged and fed to discharge lines. FIG. 5 shows the flow conditions in the classifier. It can be seen that, due to their small dimensions, the silicate particles S are discharged as an aerosol with the air stream via the upper air outlet 7, while the straw particles P fall down due to gravity and into the particle trap 8. Coarse material G, such as stones, for example, falls immediately after entering the housing 5 into the coarse-material trap 9, which is also referred to as a "stone trap."

The flow within the classifier is achieved in this embodiment by a suction device, meaning that exhaust fans are connected to the air outlet, with the effect that the supply air Z is supplied passively via the air inlet 6. In this embodiment that is shown, fresh air is supplied in the first classifying stage, while the classifying air is conducted in a circuit (not shown) in the second classifying stage, so that the moisture level can be kept constant at this stage of the process after fiberization.

Figure 2:
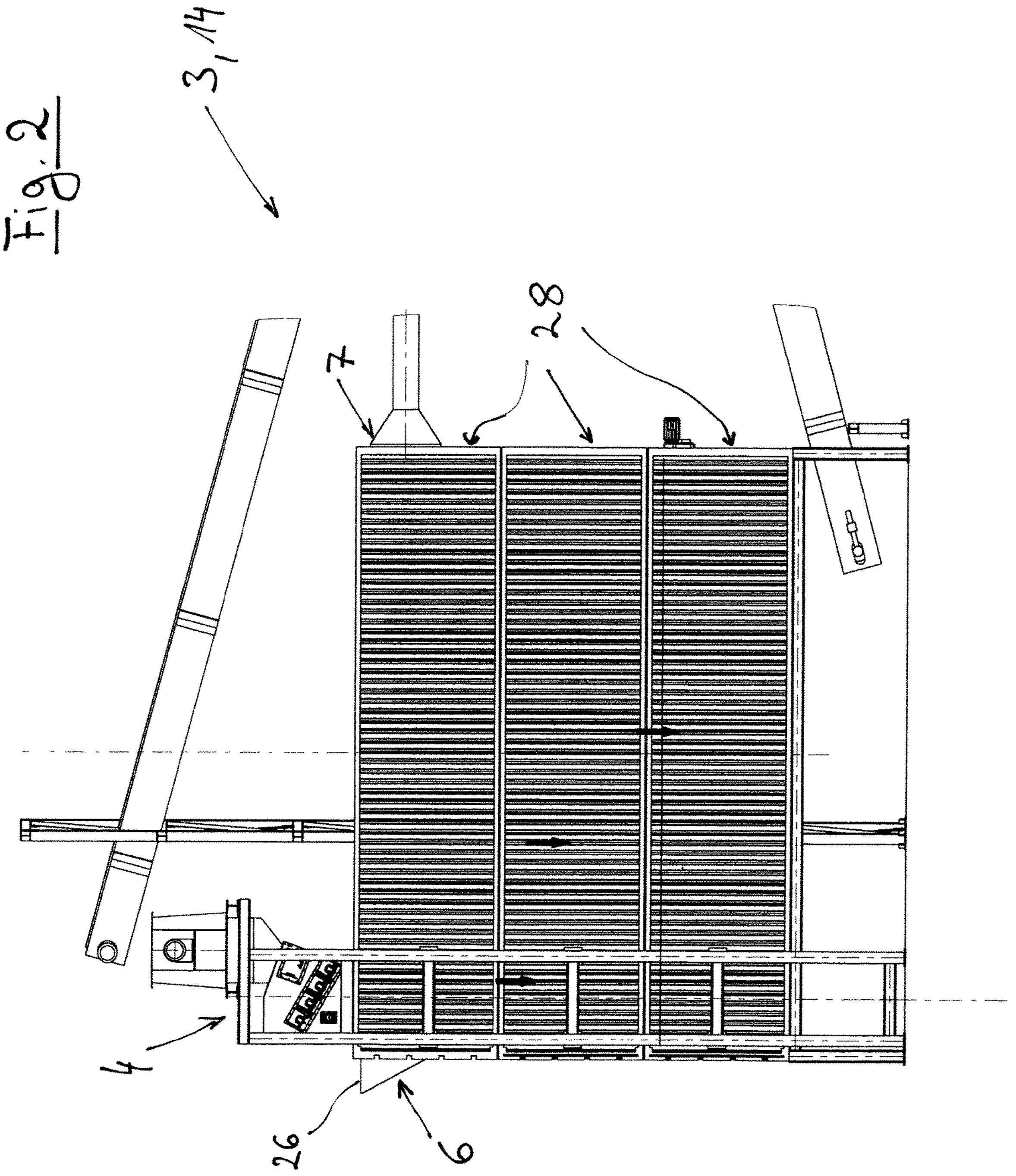
FIG. 2 is a side view of a classifier of the apparatus according to FIG. 1.
Figure 4:
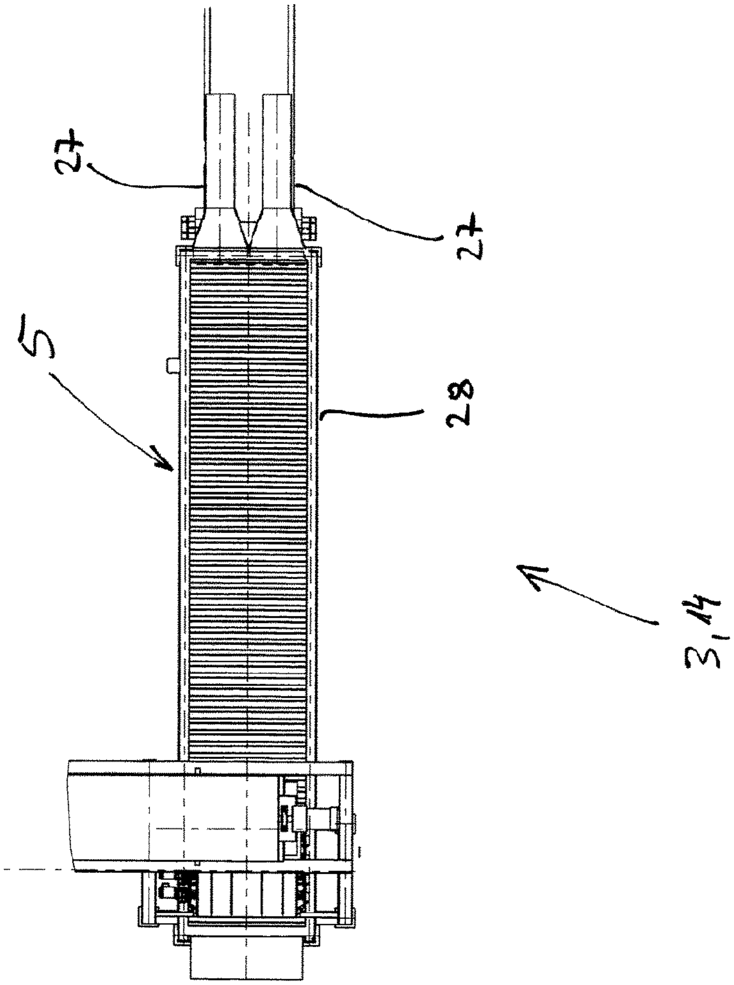
FIG. 4 is a top view of the classifier of to FIG. 2.
Figure 3:
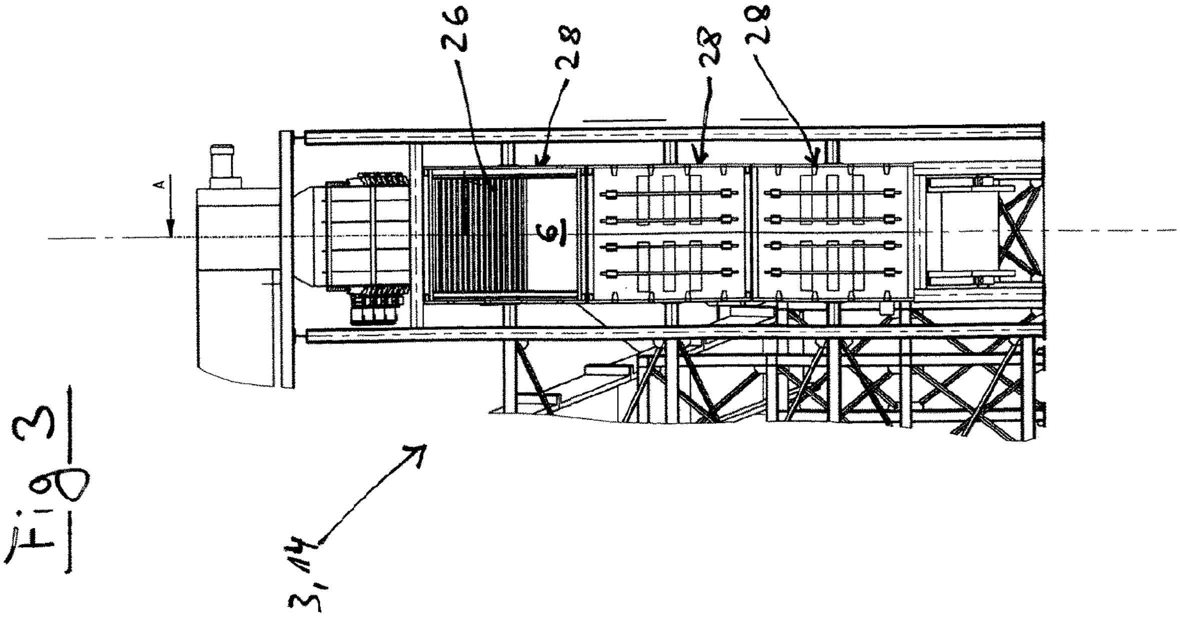
FIG. 3 is a front view of the classifier of FIG. 2.

Moreover, it can be seen in FIGS. 2 to 4 that the classifier housing in the illustrated embodiment is produced in a very simple manner from multiple ISO freight containers, specifically from three standard containers 28 that are arranged one above the other, each with a length of 40 ft. Such a construction has the great advantage that the individual parts can be easily transported.

The air inlet 6 can be formed very simply by open container doors. A screen or the like can be integrated into the inlet in order to prevent the entry of foreign bodies. In addition, a rain cover 26 can be arranged above the inlet 6.

The invention claimed is:

1. A method of making fiberboard or chipboard, the method comprising the steps of:

comminuting vegetable starting material in a first comminutor into loose plant particles and silicate particles;

feeding the plant particles and silicate particles into a first classifier having an air inlet and an air outlet;

generating an air stream in the first classifier by drawing air out of the first classifier through the air outlet;

in the first classifier, air separating silicate particles of a diameter of less than 50 μm from the plant particles by applying the air stream to the particles such that the plant particles fall by gravity in the first classifier and the silicate particles exit the first classifier via the air outlet;

discharging the fallen plant particles from the first classifier below the air outlet;

glue-coating the fallen plant particles; and compressing the glue-coated plant particles into fiberboard or chipboard.

2. The method according to claim 1, further comprising the steps of:

further comminuting the plant particles downstream of the first comminutor in a second comminutor; and in a second classifier downstream of the second comminutor separating any remaining silicate particles from the plant particles.

3. The method according to claim 2, wherein the first comminutor reduces the plant particles to coarse particles and the second comminutor reduces the plant particles to fine particles.

4. The method according to claim 2, wherein the first comminutor is a hammer mill.

5. The method according to claim 2, wherein the second comminutor fiberizes the plant particles into plant fibers.

6. The method according to claim 1, wherein the first classifier has a material inlet for the receiving the plant and silicate particles, the air inlet for the air forming the air stream is below the material inlet and above the air outlet, and there is at least one particle trap below the air outlet.

7. The method according to claim 1, further comprising the step of:

trapping and removing coarse foreign bodies from the vegetable starting material upstream of the first classifier.

8. The method according to claim 1, further comprising the step of;

crushing the particles of the stream upstream of the first comminutor.

9. The method according to claim 1, wherein the glue coating is effected by a drum mixer.

10. The method according to claim 1, further comprising the step after glue-coating and before pressing the particles of spreading the particles into a loose-particle mat.

* * * * *